United States Patent
Inoue

(10) Patent No.: US 10,437,230 B2
(45) Date of Patent: Oct. 8, 2019

(54) NUMERICAL CONTROLLER HAVING FUNCTION OF AUTOMATICALLY SELECTING STORAGE DESTINATION OF MACHINING PROGRAM

(71) Applicant: FANUC Corporation, Yamanashi (JP)

(72) Inventor: Tetsuya Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 372 days.

(21) Appl. No.: 15/193,110

(22) Filed: Jun. 27, 2016

(65) Prior Publication Data
US 2016/0378098 A1 Dec. 29, 2016

(30) Foreign Application Priority Data
Jun. 29, 2015 (JP) .................................. 2015-129626

(51) Int. Cl.
*G05B 19/408* (2006.01)

(52) U.S. Cl.
CPC .............. *G05B 19/4083* (2013.01); *G05B 2219/35001* (2013.01); *G05B 2219/35373* (2013.01)

(58) Field of Classification Search
CPC ...... G05B 19/4083; G05B 2219/35001; G05B 2219/35373; G06F 8/65; G06F 12/0246; G06F 3/0619; G06F 3/061
USPC ......................................................... 700/173
See application file for complete search history.

(56) References Cited

U.S. PATENT DOCUMENTS

| | | | |
|---|---|---|---|
| 5,019,980 A | 5/1991 | Starr et al. | |
| 5,241,679 A * | 8/1993 | Nakagawa | G06F 9/3004 710/260 |
| 2005/0209712 A1* | 9/2005 | Sagasaki | G05B 19/4093 700/28 |
| 2005/0278398 A1 | 12/2005 | Tokuda et al. | |
| 2006/0136668 A1* | 6/2006 | Rudelic | G06F 9/445 711/118 |
| 2006/0184758 A1 | 8/2006 | Satori et al. | |

(Continued)

FOREIGN PATENT DOCUMENTS

| CN | 1825271 A | 8/2006 |
|---|---|---|
| CN | 1931495 A | 3/2007 |

(Continued)

OTHER PUBLICATIONS

Decision to Grant a Patent in JP Application No. 2015-129626, dated Aug. 22, 2017, 6 pp.
Office Action in CN Application No. 201610487806.7, dated Jun. 4, 2018, 12pp.
Office Action in DE Application No. 102016007651.8, dated Dec. 14, 2018, 14pp.

*Primary Examiner* — Brian W Wathen
*Assistant Examiner* — Alicia M. Choi
(74) *Attorney, Agent, or Firm* — Hauptman Ham, LLP

(57) ABSTRACT

A numerical controller performs analysis as to whether or not an input machining program is required to be read at high speed at the time of execution of the machining program, stores the machining program in any one of a storage unit which reads a program at high speed and a storage unit which reads a program at low speed in accordance with the analysis result, and updates information on a storage destination of the machining program. In this way, the storage destination of the input machining program can be automatically selected in accordance with the contents of the machining program.

8 Claims, 7 Drawing Sheets

(56) References Cited

U.S. PATENT DOCUMENTS

| | | | |
|---|---|---|---|
| 2006/0206689 A1* | 9/2006 | Hirano | G06F 1/3203 712/200 |
| 2007/0051701 A1 | 3/2007 | Ogata et al. | |
| 2009/0276574 A1* | 11/2009 | Takai | G06F 8/445 711/118 |
| 2011/0093666 A1 | 4/2011 | Endo et al. | |
| 2012/0036511 A1 | 2/2012 | Kawai et al. | |
| 2012/0054407 A1* | 3/2012 | Hayashi | G06F 3/0605 711/4 |
| 2013/0007354 A1* | 1/2013 | Shiiba | G06F 12/0246 711/103 |
| 2014/0047251 A1* | 2/2014 | Kottilingal | G06F 1/3296 713/320 |
| 2015/0026538 A1* | 1/2015 | Sakai | G06F 11/1048 714/764 |
| 2016/0004441 A1* | 1/2016 | Takahashi | G06F 3/0613 711/155 |

FOREIGN PATENT DOCUMENTS

| | | |
|---|---|---|
| CN | 102043391 A | 5/2011 |
| CN | 102387888 A | 3/2012 |
| DE | 69031012 T2 | 10/1997 |
| JP | 62-49511 A | 3/1987 |
| JP | 6-33204 U | 4/1994 |
| JP | 8-137513 A | 5/1996 |
| JP | 8-249041 A | 9/1996 |
| JP | 10-312209 A | 11/1998 |
| JP | 11-149307 A | 6/1999 |
| JP | 2006-4011 A | 1/2006 |
| JP | 2013-73344 A | 4/2013 |

* cited by examiner

FIG.2

| PROGRAM NAME | HIGH-SPEED FLAG | SUBPROGRAM COUNTER | REPEATED CALL COUNTER | STORAGE-DESTINATION DEVICE NAME | SUBPROGRAM LIST | REPEATED CALL LIST |
|---|---|---|---|---|---|---|
| O0001 | No | 0 | 0 | NET_DRIVE | | |
| O0002 | Yes | 0 | 0 | CNC_MEM | O8001, O8003 | O8005 |
| O0003 | Yes | 0 | 0 | CNC_MEM | O8001 | O8005, O8003 |
| O8001 | No | 2 | 0 | CNC_MEM | O8004 | |
| O8002 | No | 0 | 0 | NET_DRIVE | | |
| O8003 | No | 1 | 1 | (EMPTY) | | |
| O8004 | No | 1 | 0 | (EMPTY) | | |
| O8005 | No | 0 | 2 | (EMPTY) | | |

FIG.3

| HIGH-SPEED OPERATION START | HIGH-SPEED OPERATION END | FUNCTION |
|---|---|---|
| G08P1 | G08P0 | AI CONTOURING CONTROL |
| G05.1Q1 | G05.1Q0 | |
| G05P10000 | G05P0 | |

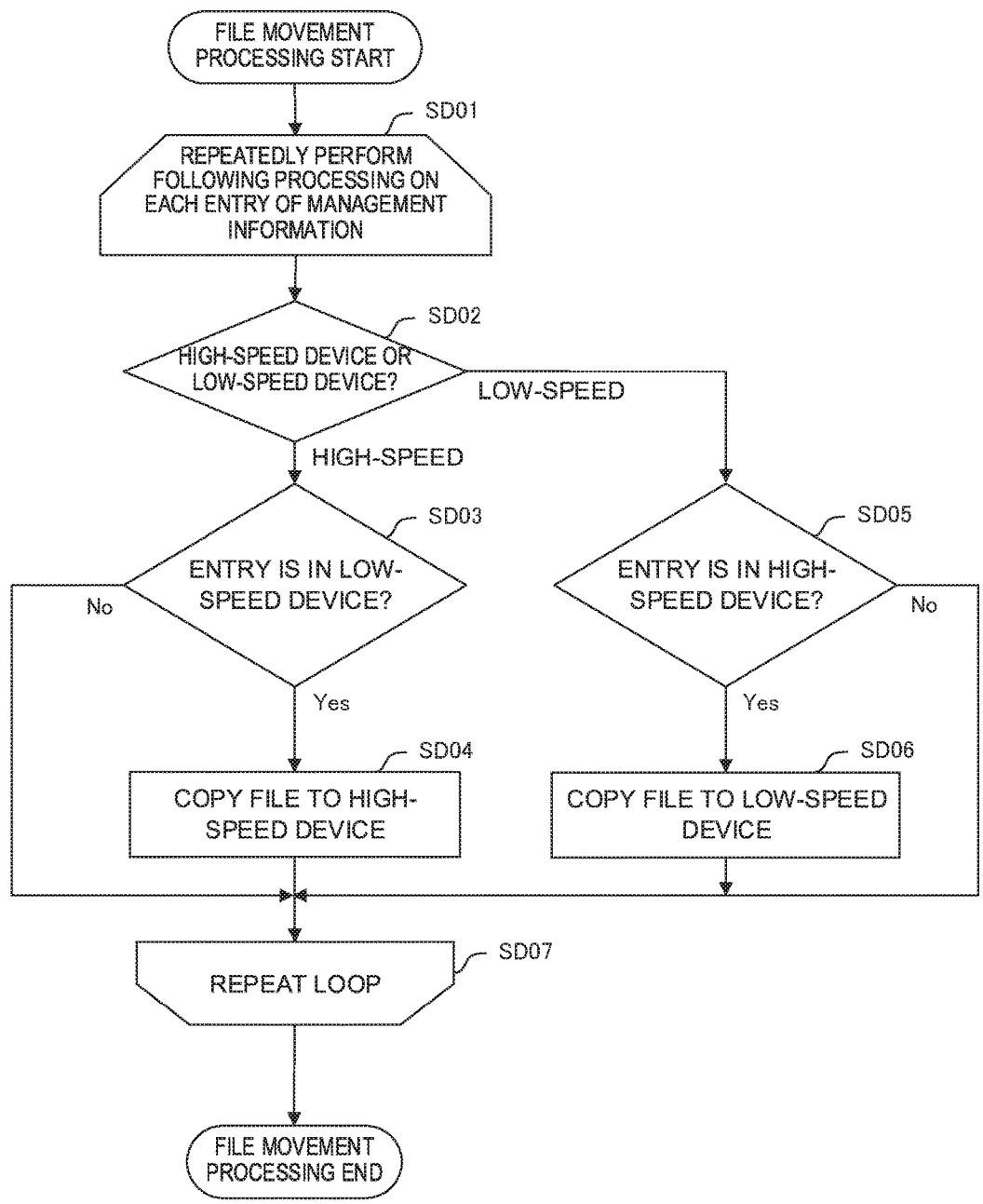

NUMERICAL CONTROLLER HAVING FUNCTION OF AUTOMATICALLY SELECTING STORAGE DESTINATION OF MACHINING PROGRAM

RELATED APPLICATIONS

The present application claims priority to Japanese Patent Application Number 2015-129626, filed Jun. 29, 2015, the disclosure of which is hereby incorporated by reference herein in its entirety.

BACKGROUND OF THE INVENTION

1. Field of the Invention

The present invention relates to numerical controllers and, in particular, to a numerical controller having the function of automatically selecting a storage destination of a machining program in accordance with the contents of the machining program.

2. Description of the Related Art

A numerical controller for controlling a machine tool incorporates nonvolatile memory for storing a machining program. Moreover, external storage units such as a memory card and a drive of a computer with which connection is established by a network can also be used for storage of the machining program.

On the other hand, the technique of collectively treating a plurality of devices having different characteristics as one storage unit is known in, for example, Japanese Patent Application Laid-Open No. 2006-4011.

When control of the machine tool based on the machining program is performed by the numerical controller, if the machining program is stored in the external storage unit and control based on the machining program is performed, reading of data is sometimes not completed in time in an operation which is required to be performed at high speed because reading and writing of data from and to the external storage unit is performed at low speed. Thus, in order to avoid such a situation, an operator determines whether or not high-speed performance is required by checking the contents of the machining program in advance and, if high-speed performance is required, the operator sets the nonvolatile memory as a storage location; if high-speed performance is not required, the operator sets the external storage unit as a storage location. However, such an operation is burdensome and the operator may make mistakes by making a misjudgment.

By using the above-described known technique of collectively treating a plurality of devices as one storage unit, the operator does not have to keep a storage destination of a machining program in mind, but there is a possibility that a machining program which is required to be read at high speed is stored in a low-speed external storage unit.

In the technique disclosed in Japanese Patent Application Laid-Open No. 2006-4011 mentioned above, when a plurality of external storage units are collectively treated as one storage unit, a storage-destination device is determined by the characteristics of a device and the characteristics of a file to be stored. In that case, a judgment on the application or attribute of the file is made by the extension or size of the file. However, in the case of a machining program, since there is a need to determine whether or not high-speed readout is necessary based on the contents of the machining program, the application or attribute of the file cannot be determined by the extension or size of the file.

SUMMARY OF THE INVENTION

An object of the present invention is accordingly to provide a numerical controller that can store a machining program in an appropriate storage destination without the need for an operator to keep the storage destination in mind.

A numerical controller according to the present invention is a numerical controller that controls a tool based on a machining program, the numerical controller including: first and second storage units that are capable of storing the machining program; a management information storing portion that stores management information including information on a storage destination of the machining program; a program inputting portion that inputs the machining program; a program analyzing portion that performs analysis as to whether or not the machining program is required to be read at high speed at the time of execution of the machining program based on the contents of the machining program input from the program inputting portion; and a program managing portion that stores the machining program in any one of the first storage unit and the second storage unit in accordance with the result of analysis performed by the program analyzing portion and updates the information on the storage destination of the machining program, the information stored in the management information storing portion. Incidentally, the first storage unit reads the machining program at higher speed than the second storage unit.

The program managing portion may be configured so as to specify a storage destination of the machining program by referring to the management information storing portion at the time of execution of the machining program and read the machining program from the specified storage destination of the machining program.

The program analyzing portion may be configured so as to obtain the analysis result indicating that the machining program is required to be read at high speed if the machining program includes a high-speed operation instruction.

The program analyzing portion may be configured so as to obtain the analysis result indicating that, in reading of the machining program, the machining program is required to be read at high speed if the machining program is called as a subprogram by another machining program which is different from the machining program during a high-speed operation in the other machining program.

The program analyzing portion may be configured so as to obtain the analysis result indicating that, in reading of the machining program, the machining program is required to be read at high speed if the machining program is repeatedly called by another machining program which is different from the machining program.

According to the present invention, the machining program is automatically stored in a storage unit with appropriate readout speed. This eliminates the need for the operator to perform switching while keeping the storage destination of the machining program in mind and can reduce operating errors and management cost.

BRIEF DESCRIPTION OF THE DRAWINGS

These and other objects and features of the present invention will become apparent from the following description of embodiments with reference to the accompanying drawings in which:

FIG. 2 is a diagram illustrating an example of management information which is stored in a management information storing portion in the numerical controller of FIG. 1;

FIG. 3 is a diagram illustrating an example of analysis information which is stored in an analysis information storing portion in the numerical controller of FIG. 1;

FIG. 7 is a flowchart of the flow of file movement processing which is executed in Step SA04 of the flowchart of FIG. 4.

DETAILED DESCRIPTION OF THE PREFERRED EMBODIMENTS

Figure 1:
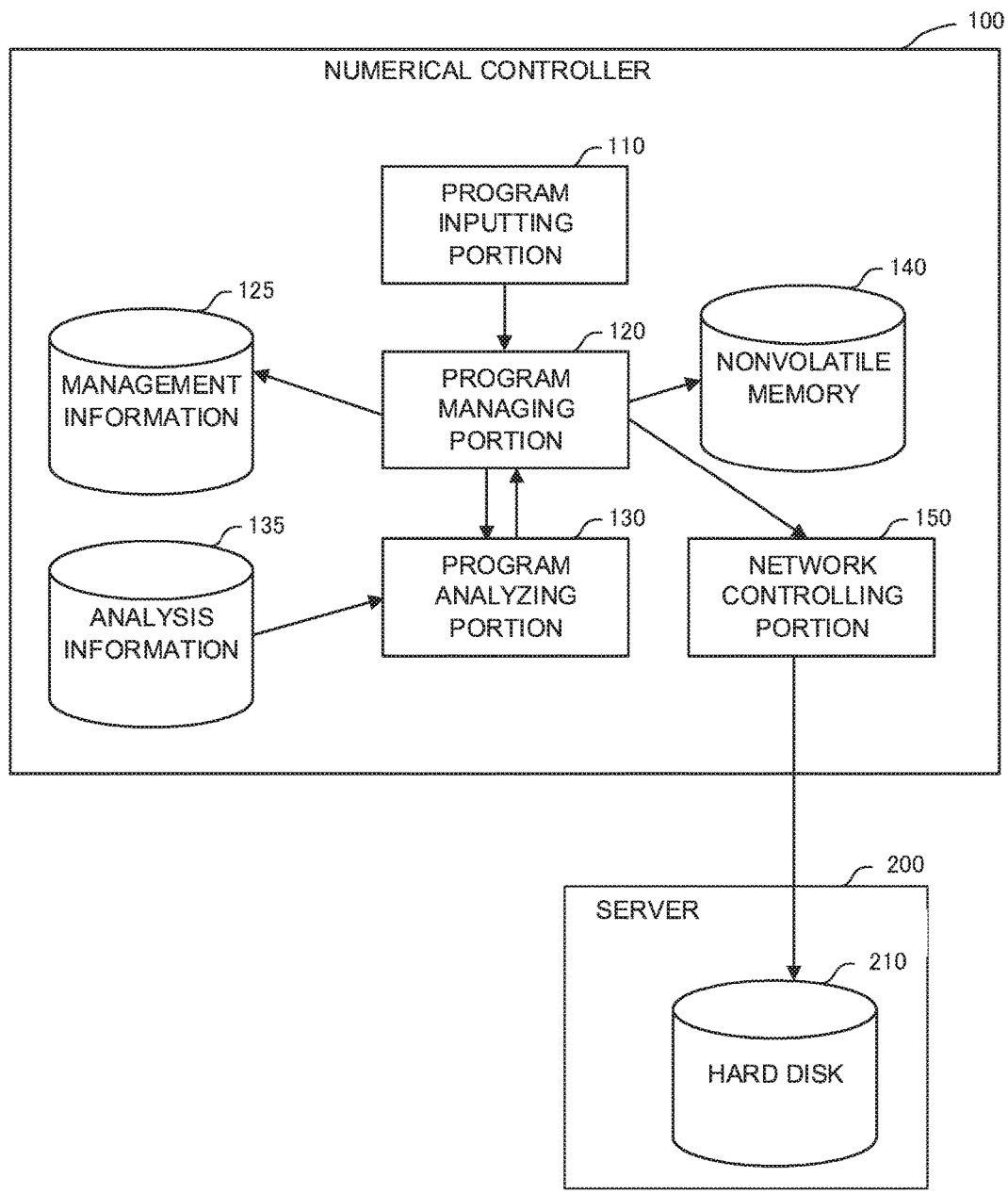
FIG. 1 is a schematic block diagram of the configuration of a numerical controller according to an embodiment of the present invention.

In the present invention, a machining program is analyzed to determine whether or not the machining program includes an instruction which performs a high-speed operation and, based on the determination result, a determination as to whether or not there is a need for high-speed readout is made. Moreover, at the time of analysis of the machining program, the name of a subprogram which the machining program calls is extracted and, if the extracted subprogram is a subprogram which is called from a range in which a high-speed operation is to be performed, a determination is made that high-speed readout is necessary. Furthermore, if the extracted subprogram is a subprogram in which repetition number is designated in a subprogram call instruction, a determination is made that high-speed readout is necessary.

Then, a machining program which is required to be read at high speed is stored in a high-speed storage unit and a machining program which is not required to be read at high speed is stored in a low-speed storage unit, and a combination of the name of the machining program and the storage unit is recorded on management information. When the machining program is read, the name of the machining program is retrieved from the management information and the machining program is read from the storage-destination storage unit.

Incidentally, in the present invention, the storage unit means a medium, such as an HDD or flash ROM, which is fixedly incorporated into an apparatus, a medium which can be relatively easily exchangeable, such as a CF card or an SD card, a medium which can store data, such as a network storage to which access can be made via a network, and what can be recognized as different regions from the side of the program even in the same apparatus or on the same medium (such as regions with different partitions on a disk and different common regions provided on the network storage).

Hereinafter, a machining program is referred to as a "program", an instruction which is required to be read at high speed is referred to as a "high-speed operation instruction", a program which is required to be read at high speed is referred to as a "high-speed program", recording information on a program as management information is referred to as "registering", management information on each program is referred to as an "entry", a storage unit is referred to as a "device", and recording a file of a program on a device is referred to as "storing".

The configuration of a numerical controller according to an embodiment of the present invention will be described in accordance with a schematic block diagram of FIG. 1.

A numerical controller 100 includes a program inputting portion 110, a program managing portion 120, a management information storing portion 125, a program analyzing portion 130, an analysis information storing portion 135, nonvolatile memory 140, and a network controlling portion 150.

The program inputting portion 110 reads a program from an external device (not shown) connected to a serial port or an Ethernet (registered trademark) port or a memory card.

The nonvolatile memory 140 is a device which is incorporated into the numerical controller and can perform high-speed readout, and, when storing a program including a high-speed operation instruction, can perform readout at a speed that can respond to a program readout speed which is required when the high-speed operation instruction is executed.

The network controlling portion 150 performs communication with an external server 200 and treats a hard disk 210 of the server 200 as an external storage unit.

The program managing portion 120 performs reading and writing on the device incorporated into the numerical controller, such as the nonvolatile memory 140, and the external storage unit such as the external device (not shown), the memory card, or the hard disk 210. When registering a program, the program managing portion 120 updates management information stored in the management information storing portion 125; when reading a program, the program managing portion 120 specifies a storage destination of the program by referring to the management information storing portion 125 and reads the program from the specified storage destination.

In the management information storing portion 125, an entry that holds information on each program is stored.

FIG. 2 illustrates an example of management information which is stored in the management information storing portion 125 in the numerical controller of FIG. 1.

The management information which is stored in the management information storing portion 125 has, as data items, the file name of a program, a high-speed flag, a subprogram counter, a repeated call counter, a storage-destination device name, a subprogram list, and a repeated call list.

The high-speed flag indicates that the program uses an instruction which is required to be read at high speed. The subprogram counter indicates the number of high-speed programs which call this program as a subprogram. The repeated call counter indicates the number of high-speed programs which repeatedly call this program as a subprogram. The storage-destination device name indicates the device name of a device in which this program is stored. The subprogram list is a list of the names of subprograms which this program calls from a range in which the program performs a high-speed operation. The repeated call list is a list of the names of subprograms which this program repeatedly calls.

For example, a program "O0002" illustrated in FIG. 2 uses a command which is required to be read at high speed, there are no high-speed programs which call this program as a subprogram and no high-speed programs which repeatedly call this program as a subprogram, and the program "O0002" is stored in a built-in storage unit of the numerical controller. Furthermore, this program "O002" calls programs "O8001" and "O8003" from a range in which the program "O0002" performs a high-speed operation and repeatedly calls programs "O8005" and "O8003".

FIG. 3 shows an example of analysis information which is stored in the analysis information storing portion 135 in the numerical controller of FIG. 1.

In the analysis information storing portion 135, an instruction to start an operation which is required to be performed at high speed at the time of execution of a program, an instruction to end the operation, and a function that is offered by the instructions are registered. In the example of FIG. 3, a "G08P1" instruction as the high-speed operation start instruction, a "G08P0" instruction as a high-speed operation end instruction which ends the high-speed operation started by the "G08P1" instruction, and an "AI contouring control" which is the function name of these instructions are stored, as one piece of analysis information associated with one another, in the analysis information storing portion 135.

The program analyzing portion 130 determines whether or not the program is required to be read at high speed by referring to the analysis information storing portion 135. Moreover, the program analyzing portion 130 extracts a subprogram name and makes a determination of the need for high-speed readout of the subprogram. The details of this program analysis processing which the program analyzing portion 130 executes will be described later.

Hereinafter, the flow of program registration processing which is executed on the numerical controller 100 will be described in accordance with flowcharts of FIGS. 4 to 7.

Figure 4:
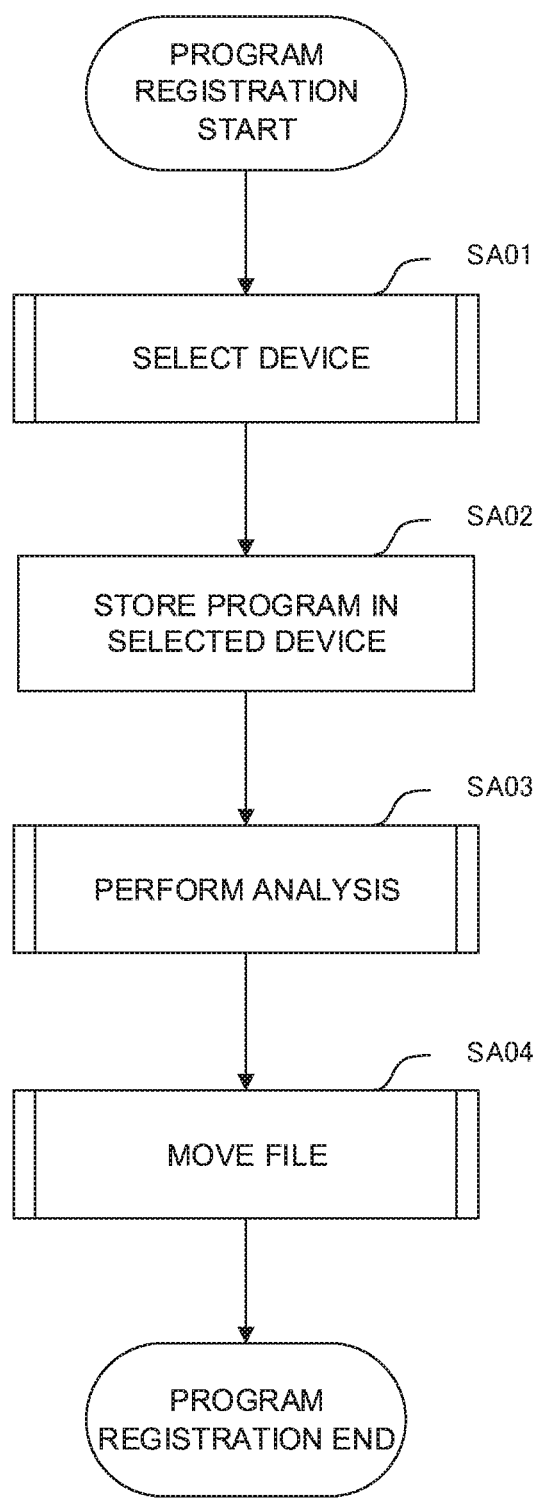
FIG. 4 is a flowchart of the overall flow of program registration processing which is executed on the numerical controller of FIG. 1.

FIG. 4 is a flowchart of the overall flow of the program registration processing which is executed on the numerical controller 100 of FIG. 1.

When a program which is used for operation control is newly registered in the numerical controller 100, first, the program managing portion 120 selects a device in which the program is to be stored (Step SA01), stores a file of the program in the selected device (Step SA02), analyzes the program (Step SA03), and then moves the file of the program (Step SA04). Incidentally, storage of the file and analysis of the program may be executed in parallel at the same time.

The flow of device selection processing which is executed in Step SA01 of the flowchart of FIG. 4 will be described in accordance with the flowchart of FIG. 5.

[Step SB01] First, based on the program name of a program which is to be registered, a judgment as to whether or not an entry of the program is present in the management information storing portion 125 is made. This is performed because, if a program to be registered is newly registered, an entry that manages the program is not present in the management information storing portion 125. Then, if an entry of the program is present in the management information storing portion 125, the procedure proceeds to Step SB03; if an entry of the program is not present in the management information storing portion 125, the procedure proceeds to Step SB02.

[Step SB02] The program managing portion 120 makes, in the management information storing portion 125, an entry of the program to be registered, and the procedure proceeds to Step SB10.

[Step SB03] A judgment as to whether or not the device name of the entry of the program to be registered is empty is made. If the device name is empty, the procedure proceeds to Step SB08; if the device name is not empty, the procedure proceeds to Step SB04.

[Step SB04] When the device name of the entry is not empty, the entry of the program to be registered has already been present in the management information storing portion 125, which raises a problem of re-registration (change) of a program of the same name. Therefore, a program of the same name as the name of the program to be registered is deleted from the device of the device name that is registered in the entry.

[Step SB05] For each of the programs on the subprogram list of the entry of the program to be registered, as the call source program is deleted, the value of the subprogram counter of the entry of each of the programs is decremented by 1.

[Step SB06] For each of the programs on the subprogram list of the entry of the program to be registered, as the call source program is deleted, the value of the repeated call counter of the entry of each of the programs is decremented by 1.

[Step SB07] The high-speed flag of the entry of the program to be registered is set to "No" and the subprogram list and the repeated call list are emptied.

[Step SB08] A judgment as to whether or not any one of the value of the subprogram counter and the value of the repeated call counter is 1 or more than 1 in the entry of the program to be registered is made. If any one of the value of the subprogram counter and the value of the repeated call counter is 1 or more than 1, the procedure proceeds to Step SB09; if both of the value of the subprogram counter and the value of the repeated call counter are 0, the procedure proceeds to Step SB10.

[Step SB09] high-speed device is selected, as high-speed readout is necessary when any one of the value of the subprogram counter and the value of the repeated call counter is 1 or more than 1.

[Step SB10] A low-speed device is selected, as there is no need for high-speed readout at the present stage, in case where both of the value of the subprogram counter and the value of the repeated call counter are 0 or in case of new registration.

Figure 6:
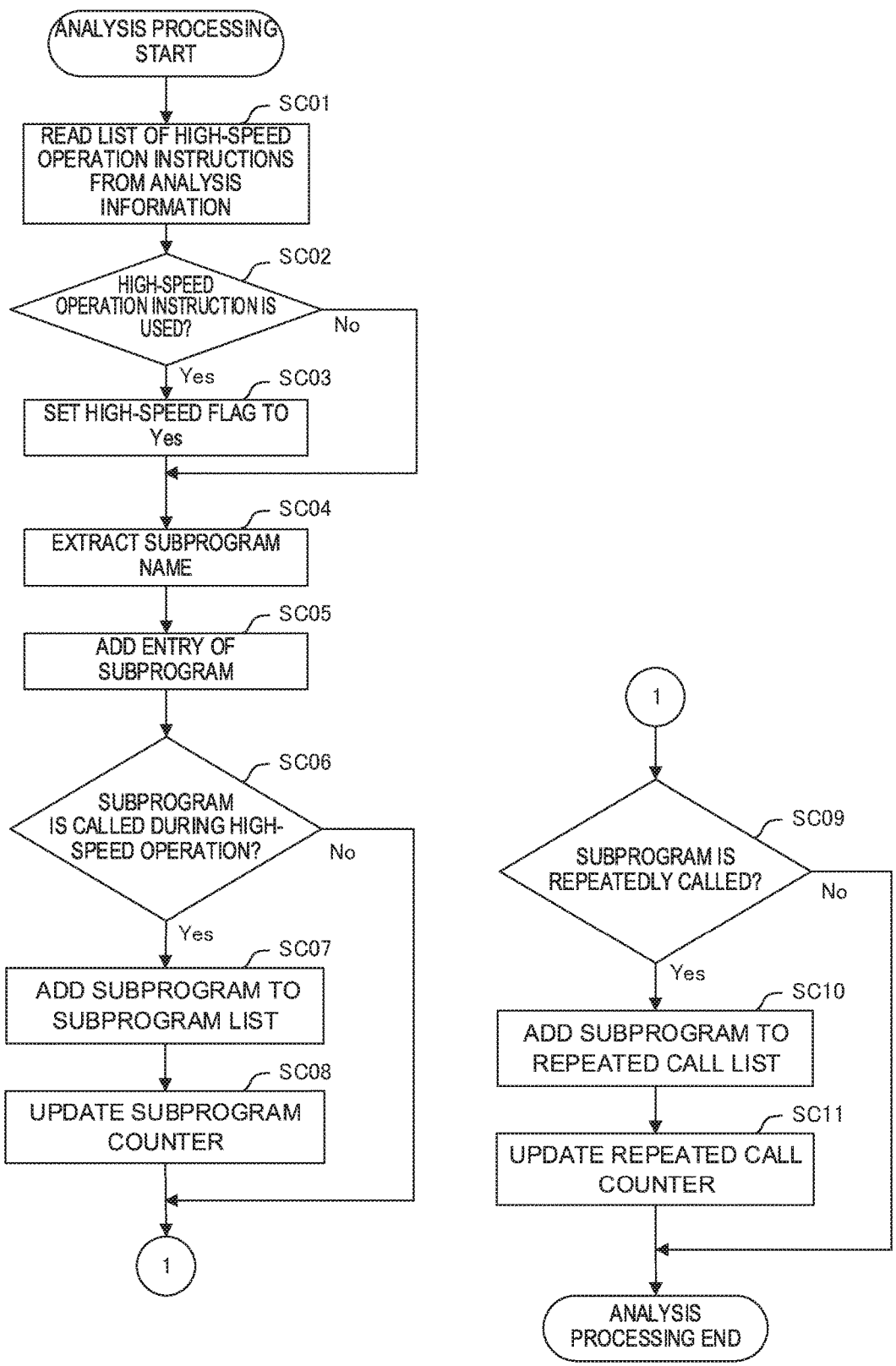
FIG. 6 is a flowchart of the flow of program analysis processing which is executed in Step SA03 of the flowchart of FIG. 4.

The flow of program analysis processing which is executed in Step SA03 of the flowchart of FIG. 4 will be described by referring to the flowchart of FIG. 6. This processing is executed by the program analyzing portion 130.

[Step SC01] The program analyzing portion 130 reads a list of high-speed operation instructions by referring to the analysis information storing portion 135.

[Step SC02] A judgment as to whether or not the high-speed operation instruction read in Step SC01 is present in the program registered in the program registration processing (hereinafter referred to as a main program) is made. If the high-speed operation instruction read in Step SC01 is present in the main program, the procedure proceeds to Step SC03; if the high-speed operation instruction read in Step SC01 is not present in the main program, the procedure proceeds to Step SC04.

[Step SC03] The high-speed flag of the entry of the main program is set to "Yes".

[Step SC04] The main program is analyzed, and the program name of a subprogram which the main program calls is extracted.

[Step SC05] If an entry of the subprogram extracted in Step SC04 is not registered in the management information storing portion 125, the entry of the subprogram is added.

[Step SC06] The main program is analyzed and a judgment as to whether or not a subprogram which is called during the high-speed operation of the main program is present is made. If a subprogram is called during the high-speed operation, the procedure proceeds to Step SC07; otherwise, the procedure proceeds to Step SC09.

[Step SC07] The subprogram on which a judgment has been made in Step SC06 that the subprogram is called during the high-speed operation of the main program is added to the subprogram list of the entry of the main program.

[Step SC08] The value of the subprogram counter of the entry of the subprogram on which a judgment has been made in Step SC06 that the subprogram is called during the high-speed operation of the main program is incremented by 1.

[Step SC09] The main program is analyzed and a judgment as to whether or not a subprogram which is repeatedly called by the main program is present is made. If a subprogram which is repeatedly called by the main program is present, the procedure proceeds to Step SC10; otherwise, this processing is ended.

[Step SC10] The subprogram on which a judgment has been made in Step SC09 that the subprogram is repeatedly called by the main program is added to the repeated call list of the entry of the main program.

[Step SC11] The value of the repeated call counter of the entry of the subprogram on which a judgment has been made in Step SC09 that the subprogram is repeatedly called by the main program is incremented by 1.

The flow of file movement processing which is executed in Step SA04 of the flowchart of FIG. 4 will be described by referring to the flowchart of FIG. 7. This processing is executed by the program managing portion 120.

[Step SD01] The program managing portion 120 repeatedly executes processing in Steps SD02 to SD06 below for each entry of the management information stored in the management information storing portion 125.

[Step SD02] For each entry, the high-speed flag and the values of the subprogram counter and the repeated call counter are referred to, and, if the high-speed flag is Yes or any one of the subprogram counter and the repeated call counter is 1 or more than 1, a determination "this entry should be stored in a high-speed device" is made and the procedure proceeds to Step SD03; otherwise, a determination "this entry should be stored in a low-speed device" is made and the procedure proceeds to Step SD05.

[Step SD03] For the entry, the value of the storage-destination device is referred to and a judgment as to whether or not the entry is stored in a low-speed device is made. If the entry is stored in a low-speed device, the procedure proceeds to Step SD04; otherwise, the procedure proceeds to Step SD07.

[Step SD04] The program of the entry is copied to a high-speed device from the low-speed device and is deleted from the low-speed device, and the storage-destination device of the entry is changed to the high-speed device.

[Step SD05] For the entry, the value of the storage-destination device is referred to, and a judgment as to whether or not the entry is stored in a high-speed device is made. If the entry is stored in a high-speed device, the procedure proceeds to Step SD06; otherwise, the procedure proceeds to Step SD07.

[Step SD06] The program of the entry is copied to a low-speed device from the high-speed device and is deleted from the high-speed device, and the storage-destination device of the entry is changed to the low-speed device.

[Step SD07] If there is a next entry, the procedure goes back to SD02 to execute the processing for the entry and the loop is repeated; if there is not a next entry, this processing is ended.

Figure 5:
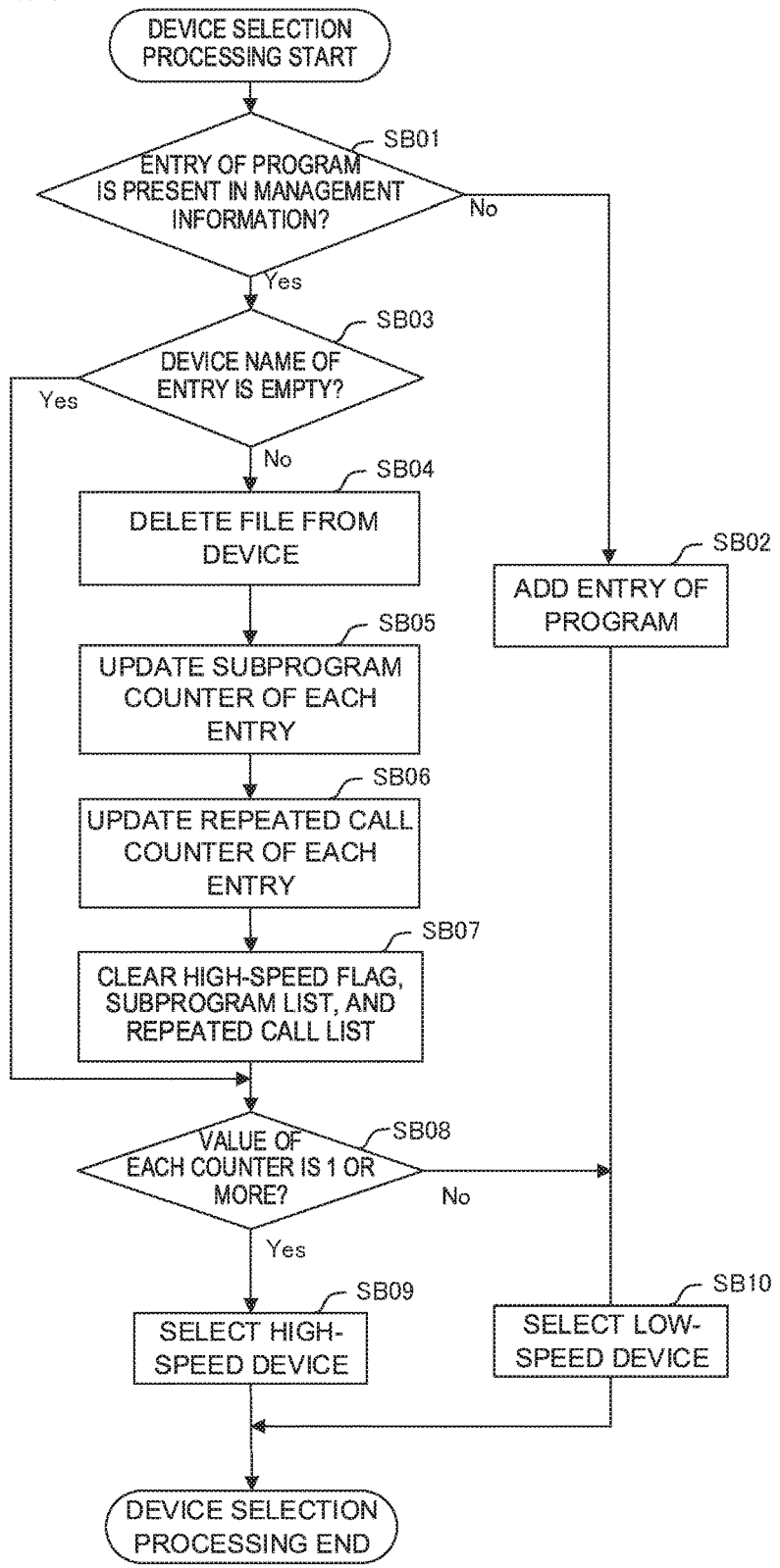
FIG. 5 is a flowchart of the flow of device selection processing which is executed in Step SA01 of the flowchart of FIG. 4.

Incidentally, in the above-described device selection processing, in case where an entry of a program to be registered is already present in the management information storing portion 125 and the storage-destination device of the entry is empty (in other words, in case where the result of judgment of the processing in Step SB03 of the flowchart of FIG. 5 is Yes), an entry has been made as a subprogram at the time of registration of the other program. In such a case, since file deletion processing is not necessary, the procedure proceeds to Step SB08 and selection of a device is performed. Processing which is performed after device selection is the same as the processing which is performed when a program is newly registered.

By the above processing, after an entry of each program is made, a storage destination of each program is determined. When the numerical controller performs operation control of a machine tool based on the program stored in this manner, the program managing portion 120 refers to the device name registered in the storage-destination device from the entry of a program to be read by referring to the management information storing portion 125, reads a file of the program from the storage unit of the device name, and executes operation control of the tool based on the read program.

While the embodiment of the present invention has been described above, the present invention is not limited to the example of the embodiment described above and may be carried out in various modes by making appropriate changes thereto.

For example, the data items of the management information and the analysis information described in the above embodiment are mere examples for carrying out the present invention, and other appropriate data items may be provided as needed.

Moreover, as for an instruction which requires a high-speed operation, the instruction described as the analysis information mentioned above, the instruction illustrated in FIG. 2 is a mere example; all the instructions which are required to be read at high speed (an instruction or an instruction group which is not completed in time in reading a program at the time of execution at the readout speed of the external storage unit) may be treated as high-speed operation instructions. Furthermore, in the embodiment described above, the analysis information regarding the high-speed operation instruction is stored in the analysis information storing portion 135 and a judgment as to whether or not a program is required to be read at high speed is made based on the analysis information. Instead, for example, a speed which is required for processing of each instruction of a program may be calculated by using a simulation or the like, and, by determining the necessary program readout speed based on the calculation result, a judgment as to whether or not the program is required to be read at high speed may be made.

The invention claimed is:

1. A numerical controller for controlling a machine tool based on a plurality of machining programs, the numerical controller comprising:
   first and second storage units that store the plurality of machining programs;
   a management information storing portion that stores management information including information on a storage destination of each of the plurality of machining programs;
   a program inputting portion that reads the plurality of machining programs;

a program analyzing portion that performs analysis of contents of each machining program among the plurality of machining programs input from the program inputting portion, to determine whether or not the each machining program is required to be read at high speed at a time of execution of the each machining program; and a program managing portion that stores the each machining program in any one of the first storage unit and the second storage unit in accordance with a result of the analysis performed by the program analyzing portion, and updates the information on the storage destination of the each machining program, the information stored in the management information storing portion, wherein the first storage unit has a higher reading speed than the second storage unit, the management information includes, for each machining program among the plurality of machining programs,

- a high-speed flag indicating whether said each machining program includes a high-speed operation instruction,
- a subprogram counter indicating a number of other machining programs, among the plurality of machining programs, which call said each machining program as a subprogram during a high-speed operation in the other machining programs, and
- a repeated call counter indicating a number of further machining programs, among the plurality of machining programs, which repeatedly call said each machining program as a subprogram.

2. The numerical controller according to claim 1, wherein the program managing portion is configured so as to specify the storage destination of each machining program among the plurality of machining programs by referring to the management information storing portion at the time of execution of the each machining program and read the each machining program from the specified storage destination of the each machining program.

3. The numerical controller according to claim 1, wherein each machining program among the plurality of machining programs is required to be read at high speed in response to the high-speed flag of said each machining program indicating that said each machining program includes a high-speed operation instruction.

4. The numerical controller according to claim 1, wherein each machining program among the plurality of machining programs is required to be read at high speed in response to the subprogram counter of said each machining program being greater than zero.

5. The numerical controller according to claim 1, wherein each machining program among the plurality of machining programs is required to be read at high speed in response to the repeated call counter of said each machining program being greater than zero.

6. The numerical controller according to claim 1, wherein the program analyzing portion is configured to based on the analysis of the contents of each machining program among the plurality of machining programs, update at least one of the following in the management information the high-speed flag of said each machining program, the subprogram counter of another machining program, among the plurality of machining programs, which is called by said each machining program during a high-speed operation of said each machining program, or the repeated call counter of a further machining program, among the plurality of machining programs, which is repeatedly called by said each machining program.

7. The numerical controller according to claim 6, wherein the program managing portion is configured to determine the storage destination of each machining program among the plurality of machining programs, based on the management information updated by the program analyzing portion that has analyzed the contents of the plurality of machining programs.

8. The numerical controller according to claim 1, wherein the program managing portion is configured to determine the storage destination of each machining program among the plurality of machining programs to be the first storage unit, in response to any one of the high-speed flag of said each machining program indicates that said each machining program includes a high-speed operation instruction, the subprogram counter of said each machining program is 1 or greater, and the repeated call counter of said each machining program is 1 or greater.

* * * * *